US012338164B2

(12) United States Patent
Simard et al.

(10) Patent No.: US 12,338,164 B2
(45) Date of Patent: Jun. 24, 2025

(54) BORON NITRIDE NANOTUBE-SILICATE GLASS COMPOSITES

(71) Applicant: NATIONAL RESEARCH COUNCIL OF CANADA, Ottawa (CA)

(72) Inventors: Benoit Simard, Ottawa (CA); Yadienka Martinez-Rubi, Ottawa (CA); Christopher Thomas Kingston, Ottawa (CA); Keun Su Kim, Ottawa (CA); Morag Clark-Heptinstall, Ottawa (CA); Maxime Gauthier, Boucherville (CA)

(73) Assignee: National Research Council of Canada, Ottawa (CA)

( * ) Notice: Subject to any disclaimer, the term of this patent is extended or adjusted under 35 U.S.C. 154(b) by 1368 days.

(21) Appl. No.: 16/635,238

(22) PCT Filed: Aug. 1, 2018

(86) PCT No.: PCT/CA2018/050941
§ 371 (c)(1),
(2) Date: Jan. 30, 2020

(87) PCT Pub. No.: WO2019/023801
PCT Pub. Date: Feb. 7, 2019

(65) Prior Publication Data
US 2021/0087102 A1   Mar. 25, 2021

Related U.S. Application Data

(60) Provisional application No. 62/540,163, filed on Aug. 2, 2017.

(51) Int. Cl.
*C03C 14/00* (2006.01)
*C01B 21/064* (2006.01)
(Continued)

(52) U.S. Cl.
CPC ........ *C03C 14/002* (2013.01); *C01B 21/0641* (2013.01); *C01B 32/15* (2017.08);
(Continued)

(58) Field of Classification Search
CPC ... B32B 18/00; B32B 2262/106; B32B 9/005; C03C 1/02; C03C 1/026; C03C 14/002;
(Continued)

(56) References Cited

U.S. PATENT DOCUMENTS

| 9,171,656 B2 | 10/2015 | Luethen et al. |
| 2015/0037448 A1 | 2/2015 | Schultz |

(Continued)

FOREIGN PATENT DOCUMENTS

| CA | 2877060 A1 * | 10/2014 | ............ B82Y 30/00 |
| CA | 2877060 C | 10/2014 | |

(Continued)

OTHER PUBLICATIONS

Office Action on Japanese Patent Application No. 2020-505433 dated May 23, 2022.
(Continued)

*Primary Examiner* — Lynda Salvatore

(57) ABSTRACT

The present application relates to boron nitride nanotube (BNNT)-silicate glass composites and to methods of preparing such composites. The methods comprise mixing BNNTs that are coated with a glass former such as boron oxide with a silicate glass precursor to create a mixture; heating the mixture under conditions to obtain a molten silicate glass; and cooling the molten silicate glass under conditions to obtain the BNNT-silicate glass composite.

13 Claims, 7 Drawing Sheets

(51) Int. Cl.
  *C01B 32/15* (2017.01)
  *C03B 18/02* (2006.01)
  *C03C 1/02* (2006.01)
  *C03C 3/089* (2006.01)
  *D01F 9/00* (2006.01)

(52) U.S. Cl.
  CPC .............. *C03C 1/02* (2013.01); *C03C 3/089* (2013.01); *D01F 9/00* (2013.01); *B32B 2262/106* (2013.01); *C03B 18/02* (2013.01); *C03C 2214/03* (2013.01); *C03C 2214/07* (2013.01); *C03C 2214/30* (2013.01)

(58) Field of Classification Search
  CPC ............ C03C 2214/03; C03C 2214/16; C03C 2214/30; C03C 3/089; C03C 1/004; C03C 2214/07; C03C 3/078; C01B 21/0641; C01B 32/15; C03B 18/02; C03B 2211/22; C03B 2211/23; C03B 5/225; C03B 5/2356; C01P 2004/03; C01P 2004/13; C04B 2111/00362; C04B 2111/00982; C04B 2235/422; C04B 2235/5248; C04B 35/83; C04B 41/009; C04B 41/4535; C04B 41/4543; C04B 41/5015; C04B 41/5022; C04B 41/5035; C04B 41/5057; C04B 41/5058; C04B 41/5059; C04B 41/5062; C04B 41/5064; C04B 41/5066; C04B 41/507; C04B 41/5071; C04B 41/5092; C04B 41/5096; C04B 41/52; C04B 41/522; C04B 41/524; C04B 41/86; C04B 41/87; C04B 41/89; D01F 9/00
  See application file for complete search history.

(56) References Cited

U.S. PATENT DOCUMENTS

| | | |
|---|---|---|
| 2016/0046823 A1 | 2/2016 | Barrera et al. |
| 2016/0083253 A1 | 3/2016 | Kim et al. |
| 2017/0342844 A1 | 11/2017 | Schmidt et al. |

FOREIGN PATENT DOCUMENTS

| | | | | |
|---|---|---|---|---|
| CN | 101817675 B | 9/2011 | | |
| EP | 3252278 A1 | * 12/2017 | ........... | C03C 14/002 |
| JP | 2016-521240 A | 7/2016 | | |
| JP | 59-64545 A | 8/2016 | | |
| KR | 101429559 B1 | 8/2014 | | |
| KR | 101634160 B1 | 6/2016 | | |
| WO | 2008060336 A2 | 5/2008 | | |
| WO | 2014123532 A1 | 8/2014 | | |
| WO | 2016100715 A1 | 6/2016 | | |

OTHER PUBLICATIONS

English Translation of the Office Action on Japanese Patent Application No. 2020-505433 dated May 23, 2022.
English Abstract of JP 59-064545.
Bansal, N.-P. et al. (2006) Boron Nitride Nanotubes-Reinforced Glass Composites. The American Ceramic Society. J. Am. Ceram. Soc. 89(1). pp. 388-390.
Bansal, N.-P. et al. (2007) Glass/BNNT Composite for Sealing Solid Oxide Fuel Cells. NASA Tech Briefs. John H. Glenn Research Center. p. 21.
Beall, G.-H. et al. (2016) Ion-Exchange in Glass-Ceramics. Frontiers in Materials. vol. 3, Article 41. pp. 1-11.
Choi, S.-R. et al. (2007) Mechanical and Microstructural Characterization of Boron Nitride Nanotubes-Reinforced SOFC Seal Glass Composite. Materials Science and Engineering A. 460-461. pp. 509-515.
Fathalizadeh, A. et al. (2014) Scaled Synthesis of Boron Nitride Nanotubes, Nanoribbons, and Nanococoons Using Direct Feedstock Injection into an Extended-Pressure, Inductively-Coupled Thermal Plasma. ACS Publications. Nano Letters. 14. pp. 4881-4886.
Li, Ling et al. (2013) Surface Wetting Processing on BNNT Films by Selective Plasma Modes. Chinese Science Bulletin. 58(27). pp. 3403-3408.
Pham, T. et al. (2016) A Universal Wet-Chemistry Route to Metal Filling of Boron Nitride Nanotubes. Nano Letters. 16. pp. 320-325.
Saggar, R. et al. (2015) Boron Nitride Nanosheets Reinforced Glass Matrix Composites. Advances in Applied Ceramics. 114:S1, S26-S33, DOI: 10.1179/1743676115Y.0000000056.
Shim, G.-I. et al. (2015) Improvement in Ballistic Impact Resistance of a Transparent Bulletproof Material Laminated with Strengthened Soda-Lime Silicate Glass. Elsevier. Composites Part B. 77. pp. 169-178.
Tatarko, P. et al. (2014) Boron Nitride Nanotubes as a Reinforcement for Brittle Matrices. Elsevier. Journal of the European Ceramic Society. ScienceDirect. 34. pp. 3339-3349.
Yum, K. et al. (2006) Measurement of Wetting Properties of Individual Boron Nitride Nanotubes with the Wilhelmy Method Using a Nanotube-Based Force Sensor. American Chemical Society. Nano Letters. 6(2). pp. 329-333.
English Machine Translation of CN 101817675B.
English Machine Translation of KR 101429559B1.
English Machine Translation of KR 101634160B1.
International Search Report dated Oct. 31, 2018.
Extended European Search Report dated Mar. 19, 2021.
English Translation of the Second Office Action received on Japanese Patent Application No. 2020-505433 dated Dec. 5, 2022.
English Abstract of JP 2016-521240.

* cited by examiner

BORON NITRIDE NANOTUBE-SILICATE GLASS COMPOSITES

CROSS-REFERENCE TO RELATED APPLICATIONS

The present application is a national phase entry of International application no. PCT/CA2018/050941 filed on Aug. 1, 2018, which claims the benefit of priority from U.S. provisional application No. 62/540,163 filed on Aug. 2, 2017, the contents of each of which are incorporated herein by reference in their entirety.

FIELD

The present application relates to boron nitride nanotube (BNNT)-silicate glass composites and to methods of preparing such composites.

BACKGROUND

Glass is an amorphous (non-crystalline) material that is often transparent and therefore has a variety of practical, technological and decorative usages. For example, glass has widespread usage in many technological areas ranging from windows and cookware to decorative parts and optoelectronics. An important type of glasses are the "silicate" glasses. This family includes: fused quartz, soda lime, sodium borosilicate and aluminosilicate glasses.

Silicate glasses such as soda-lime, borosilicate and others may be prepared by melting recycled or raw materials or mixtures thereof at high temperature (e.g. 1400-1600° C.) and subsequently forming into the desired final shape. For example, soda lime glass can be produced by melting 1) recycled soda lime glass, 2) raw materials or 3) a mixture of recycled soda lime glass with raw materials. Industrially, the third route is commonly employed.

The raw materials to produce silicate glass can generally be divided into five categories: glass formers, flux, property modifiers, colorants and fining agents. In silicate glasses, the primary glass former is silicon dioxide ($SiO_2$) but other glass formers such as diboron trioxide ($B_2O_3$), for example, in borosilicate glasses or alumina ($Al_2O_3$) in aluminosilicate glasses may also be present. A flux is added to silicate glasses to reduce the melting temperature. Examples of fluxes include sodium oxide ($Na_2O$), potassium oxide ($K_2O$) and lithium oxide ($Li_2O$). The flux is commonly added as a carbonate, which releases $CO_2$ upon heating. Property modifiers such as lime (CaO) may be added to add stability to silicate glasses. Examples of other property modifiers include magnesium oxide (MgO), barium oxide (BaO) and lead monoxide (PbO). The property modifier may be added in hydroxide form such as $Ca(OH)_2$. Fining agents are components that may be added to silicate glasses with the intent of decreasing gaseous inclusions, for example, by promoting the buoyant rise of bubbles and/or the dissolution of bubbles during heating of the raw materials.

In soda lime glass the glass forming agent is $SiO_2$ (e.g. from sand), the flux is $Na_2O$ which, as a raw material, may be in the form of $Na_2CO_3$ and the property modifier is CaO which, as a raw material, may be in the form of $Ca(OH)_2$. Soda lime glass typically also includes smaller amounts of other components that may vary, for example, depending on whether it is a container or a flat glass.

A drawback for certain uses of glass is its brittleness. For example, glass can fail catastrophically under a small impact or a thermal shock. Methods of toughening glass include thermal processing (also referred to as tempering) or chemical processing such as by ion exchange. Despite such processes for toughening, there is significant room for further improvements. In addition, these toughening processes may add significant costs to the manufacturing. As a result, many glass products do not undergo these toughening processes.

Soda lime glass is the most prevalent type of glass. It is used, for example, to make windows, beverage and food containers and other commodity items. However, soda lime glass may be susceptible to breakage via impact or be susceptible to scratches which may, for example, prevent certain uses in other domains. Soda lime glass is commonly used in the vehicle armour industry because it can be, for example, cheap to produce, have excellent transmittance in the visible and infrared regions and can withstand ballistic events. However, to provide useful protection, several layers are needed which add significant weight to the structure. Additionally, such glasses may have limited multi-hit capability.

Sapphire or transparent ceramics such as spinel ($MgO \cdot Al_2O_3$) or aluminum oxynitride (ALON) provide greater hardness and strength thus allowing for reduction of weight by as much as 50%. However, the high cost of these materials can be prohibitive because of manufacturing limitations.

Boron nitride nanotubes (BNNTs) are one-dimensional hollow structures with diameters of a few nm and lengths of several μm, hence they commonly have aspect ratios (length/diameter) which are greater than 1000. The structures can be thought of as resulting from the seamless rollup of hexagonal boron nitride sheets, one of the hardest materials. BNNT may, for example, exhibit useful mechanical properties with Young's modulus approaching 1 TPa, strength on the order of 30 GPa and/or elongation at break of more than 3%. BNNTs are also intrinsically transparent in the visible spectrum and have been shown to be stable in air up to about 900° C. and up to about 1800° C. in inert gases, vacuum or when embedded in protective matrices. The hollow interior of the BNNT may be accessible by removing the end caps, for example, either by thermal or chemical treatment. The interior can optionally be filled with atoms, ions or molecules. For instance, as reported by Pham et al.[1] BNNT can be filled with metal salts and subjected to a reduction process to produce BNNT filled with metal.

BNNT-glass composites have been prepared by methods comprising spark plasma sintering (SPS). For example, Tatarko et al.[2] disclose the use of cylindrical and bamboo-like BNNTs to reinforce brittle amorphous borosilicate glass matrix materials prepared by SPS. The composites were prepared by ball milling borosilicate glass powder with purified BNNTs in ethanol, drying in an oven to obtain a powder that was subsequently crushed and screened through a 100-mesh sieve, then pre-heated at 300° C. to remove ethanol and placed in a graphite die to be sintered at a temperature of 775° C. Values reported by Tatarko et al. for hardness and Young's modulus decreased with incorporation of BNNTs in comparison to pure borosilicate glass samples. Saggar et al.[3] disclose the use of boron nitride nanosheets (BNNSs) to reinforce an amorphous borosilicate glass matrix prepared by SPS. The composites were prepared by ball milling a mixture of BNNSs with borosilicate glass powder in ethanol, drying in ambient atmosphere at 100° C. to obtain a dried powder that was subsequently crushed and sieved using a 250 mesh, heated to 300° C. to remove trapped solvent and placed in a graphite die to be sintered at a temperature of 775° C. SPS passes pulses of DC current directly through the die that contains the sample. This results in a very rapid heating (for example, 1000 K/min) of the sample which densifies rapidly while maintaining small grain sizes. This technique can be useful for the preparation of nanomaterials but suffers from scalability.

BNNT-glass composites have also been prepared by a method comprising hot pressing. For example, Bansal et al.[4] disclose the use of about 4 wt % BNNTs to reinforce a barium calcium aluminosilicate glass composite fabricated by hot pressing. The composites were prepared by ball milling the BNNTs with a barium calcium aluminosilicate glass powder in acetone, evaporating the acetone and drying the powder in an electric oven, loading the resulting mixed powder into a graphite die and hot pressing in vacuum at a temperature of 630° C. under 10 MPa for 15 minutes. Similarly, the BNNT-glass composites containing 4 wt % of BNNTs disclosed in Choi et al.[5] were prepared via a process comprising ball milling the BNNTs with a barium calcium aluminosilicate glass G-18 powder in acetone, evaporating the acetone and drying the powder in an electric oven, loading the mixed powder into a graphite die and hot pressing in vacuum at 630° C. under 10 MPa for 15 minutes.

SUMMARY

In the studies reported herein below, BNNTs have been used to re-inforce recycled soda glass matrices. Glass composites have also been prepared using soda glass raw ingredients and BNNTs. The properties of silicate glasses such as soda glass that may, for example, be improved with the addition of BNNT include hardness, scratch resistance, modulus, strength, fracture toughness and/or chemical resistance. Pieces of soda lime glass were fabricated with various loadings of BNNT and transparent materials obtained. The hardness and modulus were measured and with 0.1 wt % loading of BNNT, for example, the improvements over control recycled glass with no BNNT were measured to be 6% and 4%, respectively. BNNTs coated with the glass former boron oxide were incorporated into the other ingredients during the first step of the glass making process (melting) and then manufacturing continued as for a standard glass casting process. Accordingly, the methods to obtain such composites may also be compatible with processes used in the industry for large scale fabrication of glass such as but not limited to floating glass and/or hot pressing technologies.

Accordingly, the present application includes a method for preparing a boron nitride nanotube (BNNT)-silicate glass composite, the method comprising:

mixing BNNTs that are coated with a glass former with a silicate glass precursor to create a mixture;
heating the mixture under conditions to obtain a molten silicate glass; and
cooling the molten silicate glass under conditions to obtain the BNNT-silicate glass composite.

The present application also includes a boron nitride nanotube (BNNT)-silicate glass composite, the composite comprising BNNTs coated with a glass former and embedded in the silicate glass. In some embodiments, the BNNT-silicate glass composites of the present application are prepared by a method for preparing a BNNT-silicate glass composite of the present application.

Other features and advantages of the present application will become apparent from the following detailed description. It should be understood, however, that the detailed description and the specific examples while indicating embodiments of the application are given by way of illustration only, since various changes and modifications within the spirit and scope of the application will become apparent to those skilled in the art from this detailed description.

BRIEF DESCRIPTION OF THE DRAWINGS

The present application will now be described in greater detail with reference to the drawings in which.

DETAILED DESCRIPTION

I. Definitions

Figure 1:
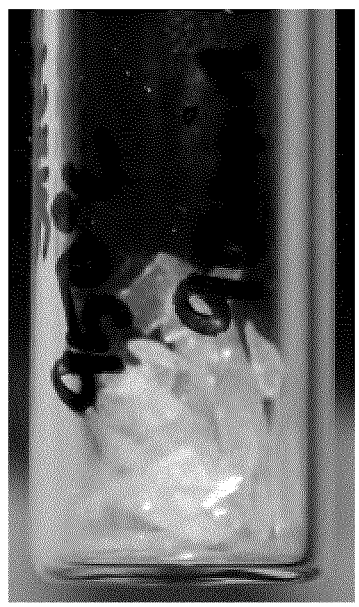
FIG. 1 shows an optical image (top) and a scanning electron micrograph (SEM) image (bottom) of the product obtained by heating boron nitride nanotubes (BNNTs) according to an exemplary embodiment of the application at 950° C. for 1.5 hours. Scale bar in SEM image shows 1.00 µm.
Figure 1:
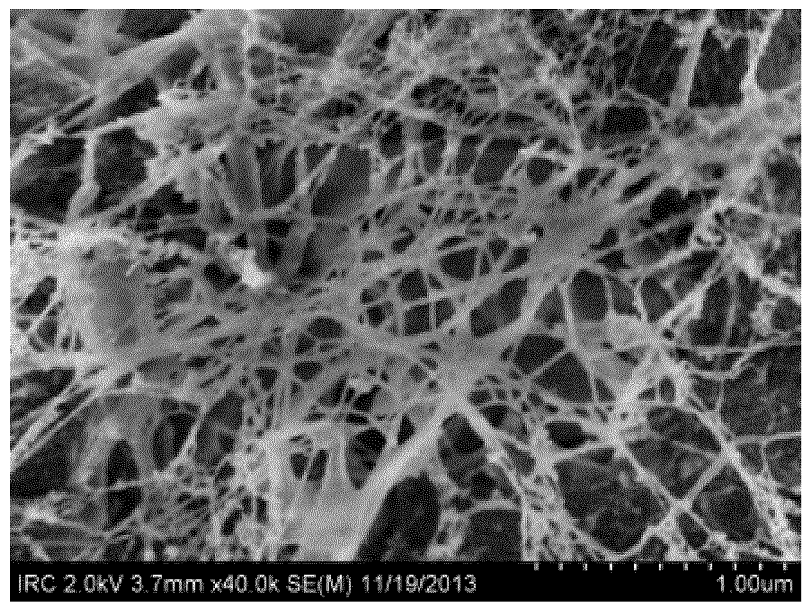

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having"

and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The term "and/or" as used herein means that the listed items are present, or used, individually or in combination. In effect, this term means that "at least one of" or "one or more" of the listed items is used or present.

As used in this application, the singular forms "a", "an" and "the" include plural references unless the content clearly dictates otherwise. For example, an embodiment including "a silicate glass precursor" should be understood to present certain aspects with one silicate glass precursor or two or more additional silicate glass precursors.

In embodiments comprising an "additional" or "second" component, such as an additional or second silicate glass precursor, the second component as used herein is chemically different from the other components or first component. A "third" component is different from the other, first, and second components, and further enumerated or "additional" components are similarly different.

The term "suitable" as used herein means that the selection of specific reagents or conditions will depend on the reaction being performed and the desired results, but nonetheless, can generally be made by a person skilled in the art once all relevant information is known.

The term "boron nitride nanotube" and the abbreviation "BNNT" as used herein refer to a polymorph of boron nitride that is in the form of a hollow nanotube which can be single-walled, double-walled or multi-walled and in which the walls are made up of six-membered rings of alternating boron and nitrogen atoms connected together in a graphene-like configuration.

The term "silicate glass" as used herein refers to a glass comprising at least 50 wt % silicon dioxide.

The term "glass former" as used herein refers to an oxide that forms an interconnected backbone glass network.

The term "flux" as used herein refers to a component that may reduce the melting temperature of the silicate glass in comparison to the silicate glass in the absence of the flux.

The term "property modifier" as used herein refers to a component that may stabilize the silicate glass in comparison to the silicate glass in the absence of the property modifier.

The term "fining agent" as used herein refers to a component that may decrease gaseous inclusions in the silicate glass in comparison to the silicate glass in the absence of the fining agent such as by promoting the buoyant rise of bubbles and/or the dissolution of bubbles during heating of silicate glass precursors.

II. Methods

Experiments with pure (uncoated) BNNT indicated that BNNTs do not mix well in molten soda lime glass made from recycled glass. In contrast, boron oxide was observed to be an excellent wetting agent for BNNT and BNNTs coated with boron oxide were incorporated into soda lime glass forming BNNT-soda lime glass composites. Both recycled soda lime glass powder and soda lime glass raw ingredients were used with the BNNTs. In addition, boron oxide protected the BNNT when subjected to a temperature in excess of 1000° C. in air.

Accordingly, the present application includes a method for preparing a boron nitride nanotube (BNNT)-silicate glass composite, the method comprising:
  mixing BNNTs that are coated with a glass former with a silicate glass precursor to create a mixture;
  heating the mixture under conditions to obtain a molten silicate glass; and
  cooling the molten silicate glass under conditions to obtain the BNNT-silicate glass composite.

In some embodiments, the BNNTs that are coated with the glass former are prepared by a method comprising:
  mixing uncoated BNNTs with a glass former to create a mixture;
  heating the mixture under conditions to melt the glass former and obtain BNNTs that are coated with molten glass former; and
  cooling the BNNTs that are coated with the molten glass former under conditions to obtain the BNNTs that are coated with the glass former.

The glass former is any glass former that is compatible with silicate glass and can be selected by a person skilled in the art. In an embodiment, the glass former is boron oxide or phosphorous oxide. In another embodiment, the glass former comprises diboron trioxide ($B_2O_3$), boric acid ($B_2O_3.3H_2O$) or phosphorous pentoxide ($P_2O_5$). In a further embodiment, the glass former is boron oxide. It is an embodiment that the glass former is phosphorous oxide.

The conditions to melt the glass former and obtain BNNTs that are coated with molten glass former are any suitable conditions. In an embodiment, the conditions comprise heating a mixture of the BNNTs with powdered glass former at a temperature of from about 450° C. to about 950° C., while tumbling, for a time sufficient for the glass former to melt and coat the BNNTs, for example, a time of from about 30 minutes to 4 hours or about 1 hour.

In some embodiments wherein the glass former is boron oxide, the BNNTs coated with boron oxide are alternatively prepared by a method comprising:
  heating a mixture of BNNTs and elemental boron under conditions to convert the elemental boron to molten boron oxide and thereby obtain BNNTs that are coated with the molten boron oxide; and
  cooling the BNNTs that are coated with the molten boron oxide under conditions to obtain the BNNTs that are coated with boron oxide.

In some embodiments, the mixture of BNNTs and elemental boron is obtained from a process disclosed in Canadian Patent No. 2,877,060 or by a process disclosed by Fathalizadeh et al. in "Scaled Synthesis of Boron Nitride Nanotubes, Nanoribbons, and Nanococoons Using Direct Feedstock Injection into an Extended-Pressure, Inductively-Coupled Thermal Plasma" Nano. Left. 2014, 14:8, 4881-4886 or PCT Application Serial No. US/2015/037448. Such processes produce BNNT mixtures that contain about 20-30 wt % of elementary boron which can be transformed into boron oxide by heating the as-produced BNNTs in the presence of an oxygen source (e.g. in air) at a temperature range of from about 650° C. to about 900° C., at which temperatures it is a liquid.

Accordingly, in some embodiments, the mixture of BNNTs and elemental boron is prepared by a method comprising:

providing one or more sources of boron, nitrogen and hydrogen to a stable induction thermal plasma at a plasma temperature in a range of 1,000-10,000 K to form a reaction mixture of boron, nitrogen and hydrogen in the plasma under a pressure of less than 2 atm; and cooling the reaction mixture to form BNNTs, the one or more sources of boron comprising elemental boron, boron nitride, borane, ammonia borane, borazine, boron trihalides, metal borides or any mixture thereof.

In an embodiment, the one or more sources of boron comprise hexagonal boron nitride. In another embodiment, the one or more sources of boron is provided as a solid feedstock. In a further embodiment, the one or more sources of boron are free of metal. It is an embodiment that the one or more sources of nitrogen comprise boron nitride, $N_2$, $NH_3$, $NH_4OH$, borazine or a mixture thereof. In another embodiment of the present application, the one or more sources of nitrogen comprise a mixture of hexagonal boron nitride and $N_2$. In a further embodiment, the one or more sources of hydrogen comprise $H_2$, $NH_3$, $NH_4OH$, a borane or a mixture thereof. In yet a further embodiment, the one or more sources of hydrogen comprise $H_2$. In another embodiment, at least one of the sources of nitrogen is a gas and at least one of the sources of hydrogen is a gas and the gases are provided to the stable induction plasma in a sheath gas. In a further embodiment, the sheath gas further comprises an inert gas. It is an embodiment that the inert gas comprises argon. In another embodiment of the present application the at least one source of hydrogen is present in the sheath gas in an amount of 5-40%. In a further embodiment, the at least one source of hydrogen is present in the sheath gas in an amount of 5-20%. In yet a further embodiment, the at least one source of nitrogen is present in the sheath gas in an amount of 10-95%. It is an embodiment that the at least one source of nitrogen is present in the sheath gas in an amount of 35-65%. In another embodiment, the reaction mixture is under a pressure of less than 1.9 atm in the stable induction plasma. In a further embodiment, the pressure is greater than 0.6 atm, greater than 0.8 atm or greater than 0.95 atm. In another embodiment, the pressure is in a range of 0.9 atm to 1.9 atm, in a range of 0.95 atm to 1.9 atm, in a range of 0.9 atm to 1 atm or in a range of 0.95 atm to 1 atm. In a further embodiment, the reaction mixture is further provided with a metal catalyst. In yet a further embodiment, the metal catalyst comprises nickel, iron, cobalt, cerium, yttrium, molybdenum or a mixture thereof. It is an embodiment that the stable induction plasma has a temperature in a range of 7,000-9,000 K at a core of the plasma. In another embodiment, cooling the reaction mixture comprises cooling in a reaction zone downstream of the stable induction plasma. In a further embodiment, the process comprises collecting the BNNTs by filtration in a filtration zone downstream of the reaction zone. In another embodiment, the one or more sources of boron and nitrogen are continuously provided to the stable induction plasma to continuously form the BNNTs.

In some embodiments of the present application, the conditions to convert the elemental boron to molten boron oxide and thereby obtain BNNTs that are coated with the molten boron oxide comprise heating a mixture of BNNTs and elemental boron at a temperature of from about 650° C. to about 900° C., about 700° C. to about 800° C. or about 750° C. in the presence of an oxygen source, for example, under air for a time sufficient for the boron to be converted to molten boron oxide and coat the BNNTs, for example, a time of from about 30 minutes to 4 hours or about 1 hour.

The silicate glass is any suitable silicate glass. In an embodiment, the silicate glass is selected from soda lime glass, borosilicate glass and aluminosilicate glass. In another embodiment of the present application, the silicate glass is soda lime glass.

The silicate glass precursor used in the methods of the present application will depend, for example, on the silicate glass and the selection of a suitable glass precursor can be made by a person skilled in the art.

In an embodiment, the silicate glass precursor is recycled silicate glass. In another embodiment, the silicate glass precursor is recycled silicate glass powder. In another embodiment, the glass precursor is raw materials which form silicate glass upon heating. In a further embodiment, the glass precursor is a mixture of recycled silicate glass and raw materials which form silicate glass upon heating. It is an embodiment that the recycled silicate glass is recycled soda lime glass. In another embodiment, the silicate glass is soda lime glass and the silicate glass precursor is recycled soda lime glass powder.

The selection of raw materials which form silicate glass upon heating can be made by a person skilled in the art.

It will be appreciated by the person skilled in the art that the glass precursor contains a suitable source of silica (such as high-purity silica sand) and at least one additional component. In an embodiment, the additional component is selected from a glass former or a precursor thereto, a flux or a precursor thereto, a property modifier or a precursor thereto, a colorant, a fining agent and a mixture thereof. It will be appreciated by a person skilled in the art that the term "or a precursor thereto" in reference to the glass former, the flux or the property modifier refers to a substance that, when heated under conditions to obtain the silicate glass is converted into the glass former, the flux, or the property modifier, respectively.

In an embodiment, the glass former is selected from diboron trioxide ($B_2O_3$), boric acid ($B_2O_3 \cdot 3H_2O$) alumina ($Al_2O_3$) and mixtures thereof. In another embodiment, the silicate glass is borosilicate glass and the glass former is diboron trioxide ($B_2O_3$) or boric acid ($B_2O_3 \cdot 3H_2O$). In a further embodiment, the silicate glass is aluminosilicate glass and the glass former is alumina ($Al_2O_3$).

In an embodiment, the flux is selected from a precursor to sodium oxide ($Na_2O$), a precursor to potassium oxide ($K_2O$), a precursor to lithium oxide ($Li_2O$) and mixtures thereof. In another embodiment, the flux is a precursor to sodium oxide ($Na_2O$). In a further embodiment of the present application, the precursor to sodium oxide ($Na_2O$) is sodium carbonate ($Na_2CO_3$).

In an embodiment, the property modifier is selected from a precursor to lime (CaO), a precursor to magnesia (MgO), a precursor to barium oxide (BaO), a precursor to lead monoxide (PbO) and mixtures thereof. In another embodiment, the property modifier is a precursor to lime (CaO). In a further embodiment, the precursor to lime is calcium hydroxide ($Ca(OH)_2$).

In an embodiment, the colorant is a 3d transition metal or ion or a 4f rare earth oxide. In some embodiments, the BNNTs are filled with the colorant.

In an embodiment, the silicate glass is soda lime glass and the fining agent is an alkali metal sulfate such as sodium sulfate ($Na_2SO_4$).

In an embodiment, the silicate glass is soda lime glass and the silicate glass precursor comprises a mixture of silicon dioxide ($SiO_2$), sodium carbonate ($Na_2CO_3$) and calcium hydroxide ($Ca(OH)_2$).

In some embodiments, the BNNTs are filled with atoms, ions or compounds. Accordingly, in some embodiments, prior to mixing the uncoated BNNTs with the glass former, the uncoated BNNTs are filled with atoms, ions or compounds. Methods of filling BNNTs with atoms, ions or compounds are known in the art and the selection of a suitable method for a particular atom, ion or compound can be made by a person skilled in the art. In some embodiments, the BNNTs are filled with transition metal atoms, ions or compounds, and these species may, for example, act as colorants (for example, 3d transition metals and ions or 4f rare earth oxides). In some embodiments, the BNNTs are filled with alkali metal salts such as sodium nitrate and/or potassium nitrate, and these species may, for example, be used to strengthen and/or toughen the glass through ion-exchange. Ion-exchange is commonly used in the glass industry to strengthen and toughen glass but this requires additional steps after the fabrication of the glass[6,7]. In contrast, in embodiments of the methods of the present application wherein the BNNTs are filled with such salts, the ion-exchange may take place in-situ when the sodium or potassium ions are released from the BNNT.

The conditions to cool the molten silicate glass and obtain the BNNT-silicate glass composite may comprise standard conditions used in the art of glassmaking and can be selected by a person skilled in the art. In an embodiment, the conditions comprise a float glass process, a rolled glass process, a glass casting process, a glass blowing process, a hot pressing process or a hot isostatic pressing (HIP) process. In an embodiment, the conditions comprise a cast glass process. In another embodiment, the conditions comprise a float glass process. In a further embodiment, the conditions comprise a rolled glass process. It is an embodiment that the conditions comprise a glass blowing process. In another embodiment of the present application, the conditions comprise a hot pressing process. In a further embodiment, the conditions comprise a hot isostatic pressing (HIP) process.

The term "float glass process" as used herein refers to a process which comprises feeding molten glass onto a bath of a suitable molten metal such as tin thereby forming a floating ribbon, reducing the temperature as the glass flows along the bath (e.g. from about 1100° C. to about 600° C.), removing the sheet from the bath by suitable means (e.g. rollers), passing the sheet through a temperature-controlled kiln under conditions to anneal the glass (e.g. for a distance of about 100 m) and cutting the annealed glass into the desired size. Float glass processes may optionally comprise top rollers positioned above the molten metal bath to control thickness and/or width of the glass ribbon.

The term "rolled glass process" as used herein refers to a process which comprises pouring a continuous stream of molten glass between a pair of water-cooled rollers, passing the sheet thereby obtained through a temperature-controlled kiln under conditions to anneal the glass and cutting the annealed glass into the desired size. Rolled glass processes may be used, for example, to prepare patterned glass in a single pass process wherein the bottom roller is engraved with a negative of the desired pattern, the top roller is smooth and the thickness is controlled by adjustment of the gap between the rollers. Rolled glass processes may also be used, for example, to prepare wired glass in a double pass process that uses two independently driven pairs of rollers, each fed with a separate flow of molten glass, the first pair of rollers producing a continuous ribbon of glass which is overlaid with wire mesh, then the glass overlaid with wire mesh passed through the second pair of rollers to obtain the ribbon of wired glass.

The term "glass casting process" as used herein refers to a process which comprises directing molten glass into a mold then cooling under conditions for the glass to solidify. The cast glass is then optionally heated under conditions to anneal the cast glass. The term "glass casting process" includes processes comprising kiln casting or casting into molds made of sand, graphite or metal.

The term "glass blowing process" as used herein refers to a process which comprises inflating molten glass into a desired shape using a blowpipe. The glass is optionally then placed in an oven or furnace under conditions to anneal the glass and thereby eliminate stresses created during the glassblowing process.

The term "hot pressing process" as used herein refers to a process which comprises directing the glass making ingredients into a mold then mechanically pressing under conditions for the pressed glass to liquefy. The liquefied pressed glass is then annealed.

The term "hot isostatic pressing" or "HIP process" as used herein refers to a process which comprises the steps of filling a high pressure containment vessel with the glass making ingredients and subjecting them to both elevated temperature and high pressure followed by cooling down to room temperature at a slow, controlled cooling rate.

III. Composites and Uses

Pieces of soda lime glass were fabricated with various loadings of BNNT and transparent materials obtained. Both recycled soda lime glass powder and soda lime glass raw ingredients were used with the BNNTs. The indentation hardness, indentation modulus and Vickers hardness were measured and with 0.1, 0.4 and 0.8 wt % loading of BNNT, showed improvements over control recycled glass with no BNNT. The BNNTs were incorporated into the soda lime glass composites in the form of BNNTs coated with the glass former boron oxide.

Accordingly, the present application includes a boron nitride nanotube (BNNT)-silicate glass composite, the composite comprising BNNTs coated with a glass former and embedded in the silicate glass.

In some embodiments, the BNNT-silicate glass composites of the present application are prepared by a method of the present application.

It will be appreciated by a person skilled in the art that embodiments of the BNNT-silicate glass composites of the present application can be varied as for embodiments of the methods of the present application.

In an embodiment, the composite is in the form of a sheet, billets or cast parts. In another embodiment, the composite is in the form of a sheet. In a further embodiment, the composite is in the form of billets. It is an embodiment that the composite is in the form of cast parts.

In an embodiment, the BNNTs are present in the composite in an amount of from about 0.1 wt % to about 20 wt %, about 0.1 wt % to about 0.8 wt %, about 0.1 wt % to about 0.4 wt %, about 0.25 wt % to about 10 wt % or about 0.5 wt % to about 5 wt % based on the total weight of the composite.

In an embodiment, the silicate glass is soda lime glass and a 1 cm thick sample of the composite with 0.1 wt % of BNNT has a reduction in transparency of about 10% relative to neat soda lime glass of the same thickness over the range in a standard transmission spectrum for soda lime glass.

In an embodiment, the BNNT-silicate glass composite is for use in transparent armour technologies (for example, as a window for armoured vehicles), as a general purpose anti-blast glass, in a barcode scanner or as a glass for touch screen devices (e.g. a smartphone, tablet or watch).

The following non-limiting examples are illustrative of the present application:

EXAMPLES

Example 1: Preparation and Characterization of Boron Nitride Nanotube (BNNT)-Soda Lime Glass Composites (a) Materials and Methods Initial experiments with pure BNNTs found that the pure BNNTs did not mix well in molten soda lime glass made from recycled glass. For example, BNNT agglomerates near and/or on the surface of the glass were observed.

Subsequent experiments were conducted with as-produced BNNT material from a process of Canadian Patent No. 2,877,060 which contains about 20-30 wt % of elementary boron in the form of nanoparticles.

In particular, the BNNT synthesis was performed at a fixed plate power of 45 kW with frequency of ~3 MHz and a base pressure of 0.92 atm. Initially, the reactor was purged and filled with Ar gas. Afterwards, two different gas streams were introduced into the plasma torch; pure Ar gas (30 slpm) was injected into the central region of the torch for plasma generation, and a ternary gas mixture of Ar (25 slpm), $N_2$ (135 slpm) and $H_2$ (60 slpm) was introduced offering further plasma stabilization and chemical reactions downstream of the plasma plume. The synthesis was preceded by a one-hour reactor preheating to heat the upper graphite liner to approximately 1000° C. At this point feedstock delivery was started and synthesis lasted for 3~4 hours. Pure hexagonal boron nitride (h-BN) powder (99.5%, avg. 70 nm, MK-hBN-N70, M K Impex Corp.) was used as a feedstock material without metallic catalyst and was prepared by drying at 100° C. for 24 h. The h-BN powder was carried from a twin-screw powder feeder to the plasma by using 3 slpm of Ar carrier gas. The typical feed rate of the h-BN powder was 0.5-1.0 g/min and about ~100 g of reaction product was collected.

Transforming this elementary boron into boron oxide was achieved via heating the as-produced material in air in a temperature range of from about 650-900° C. At these temperatures, boron oxide is liquid and as a result, while not wishing to be limited by theory, liquid boron oxide spread over the BNNT. For example, FIG. 1 shows an optical image (top) and a scanning electron microscopy image (bottom) of the glassy material produced by heating BNNTs at 950° C. for 1.5 h in air. The glassy material is transparent. SEM analysis clearly shows the presence of the BNNT web that is nicely wetted by boron oxide.

Since boron oxide is a glass forming agent compatible with $SiO_2$ and was confirmed to be a wetting agent for BNNT, this led to the following procedure to integrate BNNT into soda lime which was used to prepare several samples using commercially available soda lime glass powder:

First, the as-produced BNNT were baked in an oven under an air flow at a temperature falling in the range of 650–900° C. for one hour then were removed from the oven and allowed to cool. The temperature used to prepare the samples subjected to the tests described hereinbelow was 750° C. The desired amount of the baked material was then weighed out and mixed with the desired amount of recycled glass powder using an appropriate powder mixer (such as a coffee grinder). The mixture was placed into a silica crucible and the material baked at 1400° C. for 30 minutes. The molten mixture was cast into the desired shapes (such as a 1 cm thick hexagon) then the shape placed directly into a furnace to be annealed at a temperature of about 535° C. for a time of at least 1 hour for every 0.25 inch (0.64 cm) of thickness (for example, a time of about 5 hours for the 1 cm thick hexagon was used). This procedure was used when using a regular oven, that is, an oven that operates in ambient air.

Other experiments were performed with an atmosphere-controlled oven. In these experiments, the crucible/mold holding the mixture was placed in the oven, then the oven sealed and evacuated down to pressure of less than $1 \times 10^{-4}$ Torr to ensure that the material was completely degassed. The mixture was typically degassed for about 24 hours. Argon was then inserted at atmospheric pressure and a flow of about 0.5 L/min was generally maintained. The temperature was ramped at a rate of 15° C./min until the final temperature was reached then held for the desired time (typically 0.5 to 4 hours). Temperatures tested in the WEBB furnace under argon were 1100° C., 1175° C., 1200° C., 1250° C., 1350° C. and 1500° C. The oven was cooled to 535° C. and held for 5 hours then cooled further until it reached room temperature and the samples extracted.

Using the above general procedures, BNNT-incorporated soda lime glass samples were prepared. The content of BNNT varied between 0.1 and 50 wt %. Control samples of neat soda lime glass were also prepared using similar procedures but using only recycled ground glass powder. Transparent samples were produced and were tested for hardness and modulus.

Similar procedures were followed using a quartz furnace (which could reach a temperature of about 1200° C. under argon) and a ceramic oven (which could only reach a temperature of about 1000° C. under air).

BNNT-soda lime glass composites were also prepared using soda lime glass raw ingredients instead of the recycled soda lime glass powder.

The soda lime glass raw ingredients (glass batch) were provided in pelletized form from Glasma AB (pelletized glass raw material 3, Recipe No. 705). According to the material safety data sheet, the composition was: quartz (<60%), barium carbonate (<7%), sodium hydroxide (<2%), sodium carbonate (<15%), potassium carbonate (<10%), antimony trioxide (<1%), borax (<4%) and zinc oxide (<2.5%). These pellets were combined with 0%, 0.1%, 0.4%, 0.8%, and 1% BNNT by weight through mixing in a coffee grinder until the pellets were pulverized into powder. These BNNT-silicate glass batch powders were placed into silica crucibles and the material baked at 1400° C. for 30 minutes. The molten mixtures were cast into the desired shapes then the shape placed directly into a furnace to be annealed at a temperature of about 535° C. for a time of at least 1 hour for every 0.25 inch (0.64 cm) of thickness. Then the furnace was cooled gradually to room temperature.

(b) Results and Discussion

I. Composites

The wt % of BNNT could vary from 0.1 to 20 wt % while keeping transparency in the 350-1000 nm above 80% for 1 cm thick samples. For example, a 1 cm thick sample of the composite with 0.1 wt % of BNNT had a reduction in transparency of only about 10% relative to neat glass of the same thickness over the entire transmission range of soda lime glass. The minimum temperature that provided transparent glass was 1100° C. Boron oxide protected the BNNTs when subjected to a temperature in excess of 1000° C. in air. Scanning electron micrograph (SEM) studies showed that boron oxide coated BNNTs survived temperatures of 1400° C. in air without the glass matrix. In contrast, uncoated BNNTs are destroyed under the same conditions.

Composites prepared using the soda lime glass raw ingredients qualitatively appeared to be similar to those prepared from recycled glass.

II. Hardness Testing

The samples which underwent hardness testing were recycled glass with 0.1%, 0.4%, and 0.8% BNNT prepared by placing the powder mixture into a silica crucible and baking for ½ hour at 1400° C. The molten mixture was then cast into 1 cm thick hexagons in a graphite mold and annealed at 535° C. for 5 hours. The annealing oven was cooled to room temperature and the samples were extracted.

The micro hardness testing performed on the samples of glass-BNNT with varying concentrations of BNNT (0.1%, 0.4%, and 0.8%) described herein was indentation hardness, indentation modulus and Vickers hardness. The modulus and hardness were obtained using a CSM Instruments Microindentation tester. Hardness and elastic modulus were obtained by pressing a diamond tip into the sample and measuring the force applied, the depth of indentation, and the cross sectional area of the indenter.

a) Hardness Data

The indentation hardness ($H_{IT}$) is calculated from the test force, F, divided by the projected area of the indenter, where the projected area is the cross sectional area of indenter (A) multiplied by the depth over which the indenter and specimen are in contact ($h_c$) as shown in equation 1:

$$H_{IT} = \frac{F}{A(h_c)}$$

Figure 2:
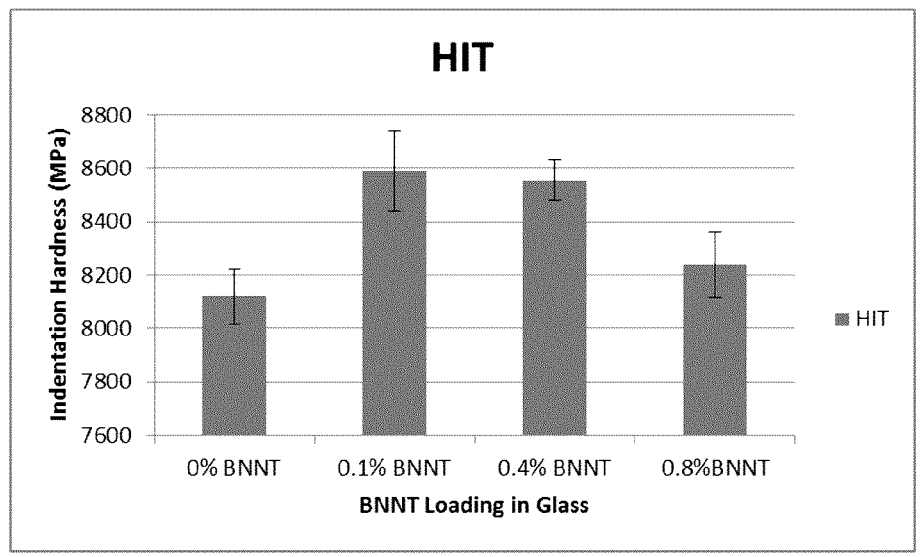
FIG. 2 is a plot showing indentation hardness (MPa) for BNNT-silica glass composites in exemplary embodiments of the application having BNNT loadings in the silica glass of 0.1 wt % (second from left); 0.4 wt % (second from right) and 0.8 wt % (far right) in comparison to the indentation hardness of neat silica glass (far left).

FIG. 2 shows the $H_{IT}$ for samples produced with 0.1 wt % (second from left), 0.4 wt % (second from right) and 0.8 wt % (far right) BNNT loading in soda lime glass in comparison to the $H_{IT}$ for a neat glass (far left).

b) Modulus Data

The indentation modulus (EIT) is calculated from the slope of the unloading curve. For homogeneous and isotropic materials, EIT approaches the Young's modulus of the material.

Figure 3:
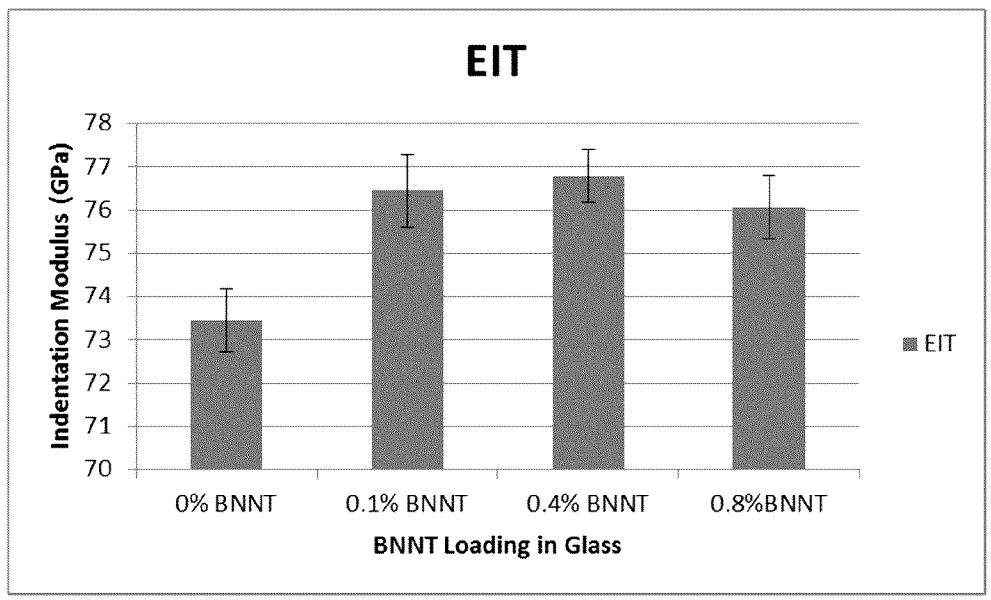
FIG. 3 is a plot showing indentation (elastic) modulus (GPa) for BNNT-silica glass composites in exemplary embodiments of the application having BNNT loadings in the silica glass of 0.1 wt % (second from left); 0.4 wt % (second from right) and 0.8 wt % (far right) in comparison to the indentation (elastic) modulus of neat silica glass (far left).

FIG. 3 shows the elastic modulus for samples produced with 0.1 wt % (second from left), 0.4 wt % (second from right) and 0.8 wt % (far right) BNNT loading in soda lime glass in comparison to the EIT for a neat glass (far left).

c) Vickers Hardness

The Vickers hardness value is proportional to the test force divided by the surface area of the indentation and can be used as a measure of resistance to plastic deformation.

Figure 4:
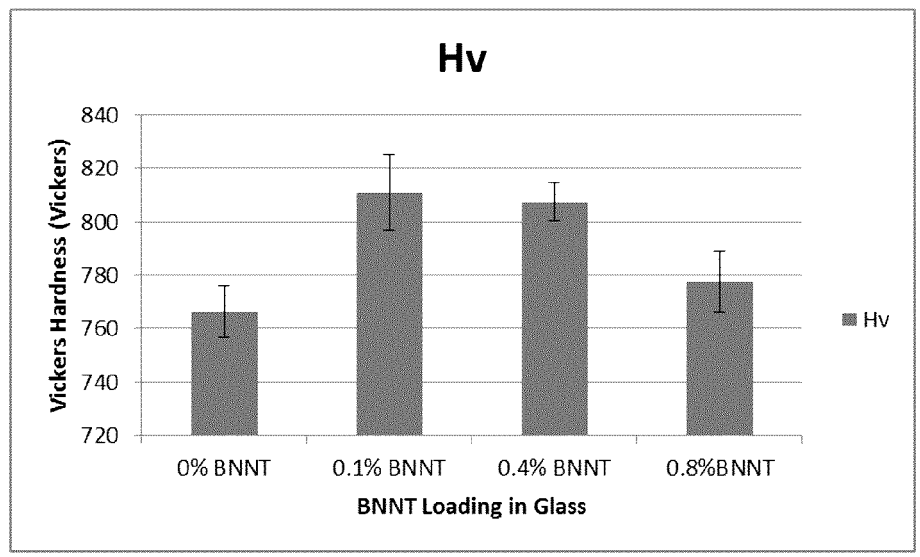
FIG. 4 is a plot showing Vickers hardness (Vickers) for BNNT-silica glass composites in exemplary embodiments of the application having BNNT loadings in the silica glass of 0.1 wt % (second from left); 0.4 wt % (second from right) and 0.8 wt % (far right) in comparison to the Vickers hardness of neat silica glass (far left).

FIG. 4 shows the Vickers hardness for samples produced with 0.1 wt % (second from left), 0.4 wt % (second from right) and 0.8 wt % (far right) BNNT loading in soda lime glass in comparison to the EIT for a neat glass (far left).

V. SEM Imaging

BNNT imbedded into the glass was not visualized directly using scanning electron microscopy (SEM).

Figure 5:
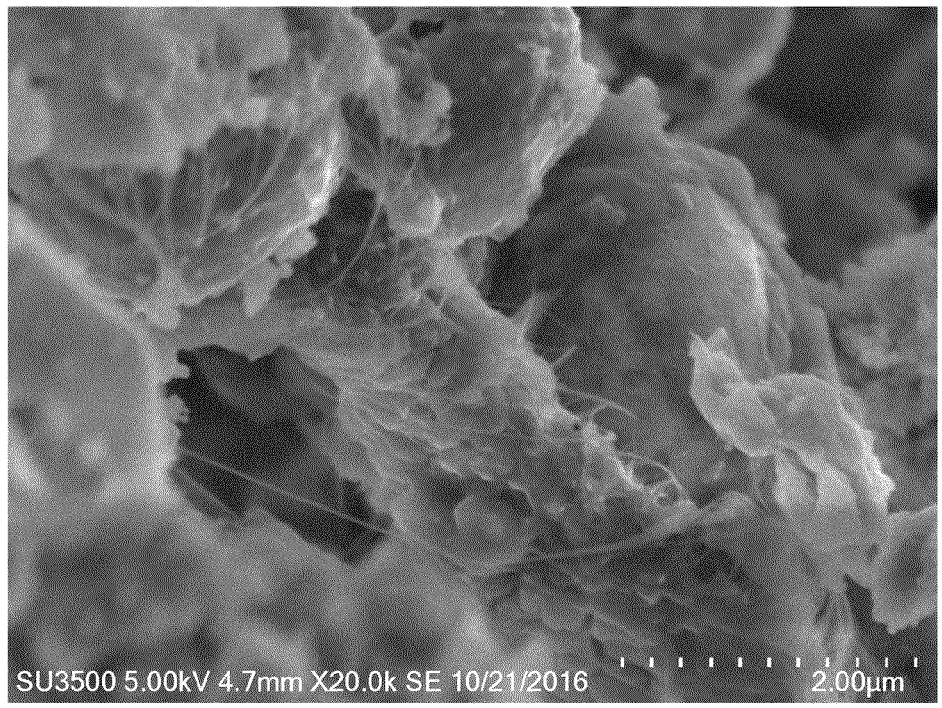
FIG. 5 is an SEM image of a BNNT-silica glass composite of an exemplary embodiment of the application after etching with HF. Scale bar shows 2.00 µm.

Instead, the glass was digested using HF and then SEM was performed on the residue left behind. In particular, a piece of glass was placed in a solution of 48% HF for 3-12 hours and then removed and allowed to air dry. The powdery residue was imaged with SEM. An exemplary image of such a sample is shown in FIG. 5. The sample shown is 3 wt % BNNT in silica glass prepared under an inert atmosphere. The fact that the glass was digested but the BNNTs remained also illustrates the chemical resistance of BNNT towards HF. While not wishing to be limited by theory, the overall chemical resistance of the glass may have been increased by the incorporation of the BNNTs.

Example 2: Hot Isostatic Pressing (HIP) and Characterization of Boron Nitride Nanotube (BNNT)-Soda Lime Glass Composites (a) Materials and Methods BNNTs prepared as in Example 1 above were blended in a low-energy blender with recycled soda-lime glass powder obtained from Vitro Minerals (MG-325; d98=45 µm). The percentages of the components of the powder blend were 0.2 wt. % BNNT and 99.8 wt. % glass powder.

The powder blend was transferred to the inside of a specially designed, cylindrical, 304L stainless steel canister in the following way: a small amount of blend was poured into the canister, followed by pressing inside the canister using a cylindrical tool steel punch by a hydraulic press to about 60% of the powder's relative density. This was repeated until the desired height inside the canister of powder was reached, in this case about 25 to 38 mm from the top rim of the canister. A layer of pre-alloyed, austenitic stainless steel powder was then poured over the pressed glass-BNNT blend, followed by a similar application of pressure as described above. The amount of powder was chosen so that its upper surface reached about 1 to 3 mm from the top rim of the canister. This stainless steel powder's function was to serve as a filter during the degassing operation. Two layers of thin alumina felt (squares 1"×1"×2 mm) were then placed one on top of the other and placed in the center of the top layer of the compressed stainless steel powder. These felt pieces were also intended to serve as filters during the degassing operation. A circular, stainless steel cover plate featuring a thick-walled stainless steel tube in its center was then inserted in the canister and placed on top of the stacked powder layers. This was followed by welding of the cover plate to the top rim of the canister. The sealed canister was then inserted in a vertical resistance furnace and a vacuum gauge was inserted between the cover plate's tube and a mechanical vacuum pump.

A vacuum degassing cycle was then carried out as follows: (1) The vacuum pump was turned on until a stable vacuum of $7 \times 10^{-2}$ torr was reached; (2) The furnace was turned on and the temperature was set to 150° C. When this temperature was reached, the canister was kept under mechanical vacuum at 150° C. for 18 h. (3) The temperature was then increased to 550° C. When this temperature was reached, the canister was kept under mechanical vacuum at 550° C. for 4 h. (4) The temperature was then decreased to room temperature.

After the above degassing step, the canister vacuum tube was crimped and sealed by welding. The sealed, degassed canister was then inserted in a AIP10-30H Hot Isostatic Press from AIP Inc. and submitted to the following HIP cycle: (1) Simultaneous pressure increase of 139 PSI/min. up to 30000 PSI and temperature increase of 6° C./min. to 1250° C.; (2) Plateau of 4 h at 30000 PSI and 1250° C.; and (3) Simultaneous pressure decrease of 24 PSI/min and temperature decrease of 1° C./min down to room temperature and pressure.

Figure 6:
FIG. 6 is a photograph of canisters after Hot Isostatic Pressing (HIP) of recycled soda-lime glass powder (specimen G-1; left hand side of image) according to a comparative example of the application and recycled soda-lime glass powder plus 0.2 wt % BNNTs (specimen G-2; right hand side of image) according to an exemplary embodiment of the present application.

The HIPed canister containing the glass-BNNT composite (specimen G-2) is shown in FIG. 6 (right hand side of image) along with another, similarly processed HIPed canister which had been filled only with soda-lime glass powder to serve as a baseline (specimen G-1; left hand side of image). A ruler has also been included in the image to show scale.

The stainless steel material was removed from the HIPed glass composite by tracing a few lines in the stainless steel by grinding and peeling off the stainless steel material by hand.

(b) Results and Discussion

Figure 7:
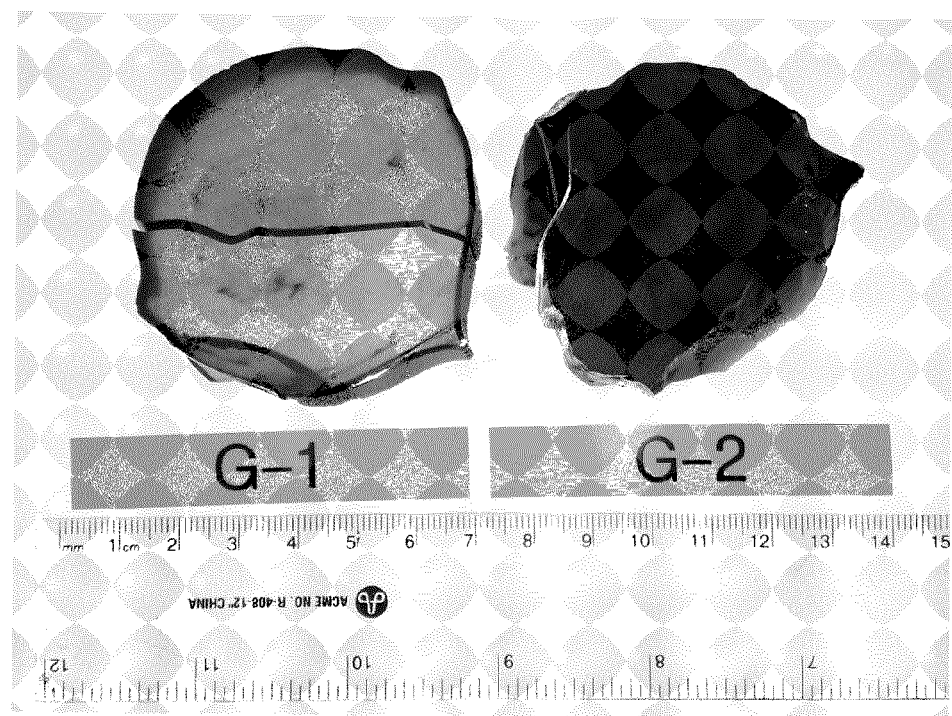
FIG. 7 is a photograph of ⅝"-thick slices cut from HIPed recycled soda-lime glass powder (specimen G-1; left hand side of image) according to a comparative example of the application and soda-lime glass powder plus 0.2 wt % BNNTs (specimen G-2; right hand side of image) according to an exemplary embodiment of the present application.

A ⅝"-thick slice was cut from the center of each cylindrical, HIPed glass-based material using a circular diamond saw. The slices are shown in FIG. 7 along with a ruler to show scale. It was observed that both samples were transparent to light, but the pure glass specimen G-1 (left hand side of image) was amber-colored, while the glass-0.2 wt % BNNT composite specimen G-2 (right hand side of image) was a darker, brownish hue. The color observed in these samples was due to contamination with metal from the canister.

While the present application has been described with reference to what are presently considered to be the preferred examples, it is to be understood that the application is not limited to the disclosed examples. To the contrary, the present application is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

FULL CITATIONS FOR DOCUMENTS REFERRED TO IN THE DESCRIPTION

[1] T. Pham, A. Fathalizadeh, B. Shevitski, S. Turner, S. Aloni and A. Zettl. "A universal wet-chemistry route to metal filling of boron nitride nanotubes" *Nanoletters,* 2016, 16, 320-325.

[2] P. Tatarko, S. Grasso, H. Porwal, Z. Chlup, R. Saggar, I. Dlouhy and M. J. Reece, "Boron nitride nanotubes as a reinforcement for brittle matrices" *Journal of the European Ceramic Society* 2014, 34, 3339-3349.

[3] R. Saggar, H. Porwal, P. Tatarko, I. Dlouhý and M. J. Reece, "Boron nitride nanosheets reinforced glass matrix composites", *Advances in Applied Ceramics* 2015, 114: sup1, S26-S33, DOI: 10.1179/1743676115Y.0000000056.

[4] N. P. Bansal, J. B. Hurst and S. R. Choi, "Boron nitride nanotubes-reinforced glass composites" 30th International Conference and Exposition on Advanced Ceramics and Composites, American Ceramic Society, Cocoa Beach, Florida, Jan. 22-27, 2006; *J. Am. Ceramic Soc.,* 2006, 89:1, 388-390.

[5] S. R. Choi, N. P. Bansal and A. Garg, "Mechanical and microstructural characterization of boron nitride nanotubes-reinforced SOFC seal glass composite" *Materials Science and Engineering A* 2007, 460-461, 509-515.

[6] G-I Shim, S-H Kim, H-W Eom, D-L Ahn, J-K Park and S-Y Choi, "Improvement in ballistic impact resistance of a transparent bulletproof material laminated with strengthened soda-lime silicate glass" *Composites Part B,* 2015, 77, 169-178.

[7] G. H. Beal, M. Comte, M. J. Dejneka, P. Marques, P. Pradeau and C. Smith, "Ion-exchange in glass-ceramics" *Frontiers in Materials,* 2016, 3, Article 41.

The invention claimed is:

1. A method for preparing a boron nitride nanotube (BNNT)-silicate glass composite, the method comprising:
    mixing BNNTs that are coated with boron oxide with a silicate glass precursor to create a mixture, the BNNTs that are coated with boron oxide prepared by:
        obtaining BNNTs that are coat with mollen boron oxide; and
        cooling the BNNTs that are coated with the mollen boron oxide to obtain the BNNTs that are coated it boron oxide;
    heating the mixture to obtain a molten silicate glass; and
    cooling the molten silicate glass to obtain the BNNT-silicate glass composite.

2. The method of claim 1, wherein the BNNTs that are coated with boron oxide are prepared by a method comprising:
    mixing uncoated BNNTs with diboron trioxide ($B_2O_3$) or boric acid ($B_2O_3 \cdot 3H_2O$) to create a mixture;
    heating the mixture to melt the diboron trioxide ($B_2O_3$) or boric acid ($B_2O_3 \cdot 3H_2O$) and obtain BNNTs that are coated with molten boron oxide; and
    cooling the BNNTs that are coated with the molten boron oxide to obtain the BNNTs that are coated with boron oxide.

3. The method of claim 2, wherein prior to mixing with the diboron trioxide ($B_2O_3$) or boric acid ($B_2O_{3\cdot3}H_2O$), the BNNTs are filled with atoms, ions or compounds.

4. The method of claim 1, wherein the BNNTs coated with boron oxide are prepared by a method comprising:
    heating a mixture of uncoated BNNTs and elemental boron to convert the elemental boron to molten boron oxide and thereby obtain BNNTs that are coated with the molten boron oxide; and
    cooling the BNNTs that are coated with the molten boron oxide to obtain the BNNTs that are coated with boron oxide.

5. The method of claim 4, wherein the mixture of the uncoated BNNTs and elemental boron is prepared by a method comprising:
    providing one or more sources of boron, nitrogen and hydrogen to a stable induction thermal plasma at a plasma temperature in a range of 1,000-10,000 K to form a reaction mixture of boron, nitrogen and hydrogen in the plasma under a pressure of less than 2 atm; and
    cooling the reaction mixture to form the uncoated BNNTs, the one or more sources of boron comprising elemental boron, boron nitride, borane, ammonia borane, borazine, boron trihalides, metal borides or any mixture thereof.

6. The method of claim 1, wherein the silicate glass is selected from soda lime glass, borosilicate glass and aluminosilicate glass.

7. The method of claim 6, wherein the silicate glass is soda lime glass and the silicate glass precursor is recycled soda lime glass powder.

8. The method of claim 6, wherein the silicate glass is soda lime glass and the silicate glass precursor comprises a mixture of silicon dioxide (SiO$_2$), sodium carbonate (Na$_2$CO$_3$) and calcium hydroxide (Ca(OH)$_2$).

9. The method of claim 1, wherein the cooling the molten silicate glass and obtaining the BNNT-silicate glass composite comprise using: a float glass process, a rolled glass process, a glass casting process, a glass blowing process, a hot pressing process or a hot isostatic pressing process.

10. The method of claim 9, wherein the cooling the molten silicate glass and obtaining the BNNT-silicate glass composite comprise using the float glass process.

11. A boron nitride nanotube (BNNT)-silicate glass composite prepared by a method as defined in claim 1.

12. The composite of claim 11, wherein the BNNTs are present in an amount of about 0.1 wt % to about 20 w1%, based on the total weight of the composite.

13. The composite of claim 12, wherein the BNNTs are present in an amount of about 0.1 wt % to about 0.8 wt %, based on the total weight of the composite.

* * * * *